(12) United States Patent
Sato et al.

(10) Patent No.: US 10,818,438 B2
(45) Date of Patent: Oct. 27, 2020

(54) MULTILAYER CERAMIC CAPACITOR

(71) Applicant: TAIYO YUDEN CO., LTD., Chuo-ku, Tokyo (JP)

(72) Inventors: So Sato, Takasaki (JP); Yoshiaki Iijima, Takasaki (JP); Takashi Sasaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/653,227

(22) Filed: Jul. 18, 2017

(65) Prior Publication Data
US 2018/0025844 A1    Jan. 25, 2018

(30) Foreign Application Priority Data

Jul. 25, 2016  (JP) ................. 2016-145122

(51) Int. Cl.
| | | |
|---|---|---|
| H01G 4/232 | (2006.01) | |
| H01G 4/224 | (2006.01) | |
| H01G 4/30  | (2006.01) | |
| H01G 2/10  | (2006.01) | |
| H01G 4/12  | (2006.01) | |
| H01G 4/008 | (2006.01) | |

(52) U.S. Cl.
CPC ............ *H01G 4/306* (2013.01); *H01G 2/103* (2013.01); *H01G 4/008* (2013.01); *H01G 4/12* (2013.01); *H01G 4/1209* (2013.01); *H01G 4/224* (2013.01); *H01G 4/232* (2013.01); *H01G 4/30* (2013.01); *H01G 4/2325* (2013.01)

(58) Field of Classification Search
CPC .......... H01G 4/30; H01G 4/224; H01G 4/232; H01G 2/103; H01G 4/1209

USPC .......... 361/321.2, 301.4, 321.1, 321.3, 306.3
See application file for complete search history.

(56) References Cited

U.S. PATENT DOCUMENTS

| | | | | |
|---|---|---|---|---|
| 2009/0323253 A1* | 12/2009 | Kobayashi | ............ | H01G 4/005 361/301.4 |
| 2014/0085767 A1* | 3/2014 | Kang | ............ | H01G 4/12 361/301.4 |
| 2014/0345926 A1* | 11/2014 | Lee | ............ | H01G 4/30 174/260 |
| 2015/0021082 A1* | 1/2015 | Park | ............ | H05K 1/111 174/260 |

(Continued)

FOREIGN PATENT DOCUMENTS

JP    2012256947 A    12/2012

*Primary Examiner* — Arun Ramaswamy
(74) *Attorney, Agent, or Firm* — Law Office of Katsuhiro Arai (57) ABSTRACT

In an embodiment, a multilayer ceramic capacitor 10 has supplementary dielectric layers 11*d*, each having a first cover part 11*d*1 that covers the space between two first base conductor films 11*c* on each of both height-direction faces, and second cover parts 11*d*2 that connect to the first cover part 11*d*1 and also cover parts of the first base conductor films 11*c*, respectively, in the length direction. External electrodes 12, 13 each have a second base conductor film 12*a*, 13*a* attached to a one length-direction face and to one length-direction edges of two first base conductor films 11*c* on the respective height-direction faces, and a surface conductor film 12*b*, 13*b* attached continuously to the surface of the second base conductor film 12*a*, 13*a* and also to the parts of the surfaces of the two first base conductor films 11*c* not covered by the second cover parts 11*d*2.

13 Claims, 6 Drawing Sheets

(56) References Cited

U.S. PATENT DOCUMENTS

| | | | |
|---|---|---|---|
| 2015/0084487 A1* | 3/2015 | Mori | H01L 41/0472 |
| | | | 310/364 |
| 2015/0194266 A1* | 7/2015 | Sawada | H01G 4/232 |
| | | | 361/301.4 |
| 2015/0279567 A1* | 10/2015 | Nishisaka | H01G 4/012 |
| | | | 361/301.4 |

* cited by examiner

<<First Prototype>>

| La(μm) | Lc(μm) | Lc/La | Separation test | Solder connection test |
|---|---|---|---|---|
| 150 | 6.0 | 0.040 | 7/100 | 0/100 |
| 150 | 6.5 | 0.043 | 4/100 | 0/100 |
| 150 | 7.0 | 0.046 | 2/100 | 0/100 |
| 150 | 7.5 | 0.050 | 0/100 | 0/100 |
| 150 | 8.0 | 0.053 | 0/100 | 0/100 |
| 150 | 9.0 | 0.060 | 0/100 | 0/100 |
| 150 | 10.0 | 0.067 | 0/100 | 0/100 |
| 150 | 20.0 | 0.133 | 0/100 | 0/100 |
| 150 | 30.0 | 0.200 | 0/100 | 0/100 |
| 150 | 40.0 | 0.267 | 0/100 | 0/100 |
| 150 | 50.0 | 0.333 | 0/100 | 0/100 |
| 150 | 60.0 | 0.400 | 0/100 | 0/100 |
| 150 | 70.0 | 0.467 | 0/100 | 0/100 |
| 150 | 80.0 | 0.533 | 0/100 | 0/100 |
| 150 | 90.0 | 0.600 | 0/100 | 0/100 |
| 150 | 95.0 | 0.633 | 0/100 | 1/100 |
| 150 | 100.0 | 0.667 | 0/100 | 2/100 |

<<Second Prototype>>

| La(μm) | Lc(μm) | Lc/La | Separation test | Solder connection test |
|---|---|---|---|---|
| 250 | 11.0 | 0.044 | 2/100 | 0/100 |
| 250 | 11.5 | 0.046 | 1/100 | 0/100 |
| 250 | 12.0 | 0.048 | 1/100 | 0/100 |
| 250 | 12.5 | 0.050 | 0/100 | 0/100 |
| 250 | 13.0 | 0.052 | 0/100 | 0/100 |
| 250 | 14.0 | 0.056 | 0/100 | 0/100 |
| 250 | 15.0 | 0.060 | 0/100 | 0/100 |
| 250 | 20.0 | 0.080 | 0/100 | 0/100 |
| 250 | 30.0 | 0.120 | 0/100 | 0/100 |
| 250 | 40.0 | 0.160 | 0/100 | 0/100 |
| 250 | 50.0 | 0.200 | 0/100 | 0/100 |
| 250 | 60.0 | 0.240 | 0/100 | 0/100 |
| 250 | 70.0 | 0.280 | 0/100 | 0/100 |
| 250 | 80.0 | 0.320 | 0/100 | 0/100 |
| 250 | 90.0 | 0.360 | 0/100 | 0/100 |
| 250 | 100.0 | 0.400 | 0/100 | 0/100 |
| 250 | 110.0 | 0.440 | 0/100 | 0/100 |
| 250 | 120.0 | 0.480 | 0/100 | 0/100 |
| 250 | 130.0 | 0.520 | 0/100 | 0/100 |
| 250 | 140.0 | 0.560 | 0/100 | 0/100 |
| 250 | 150.0 | 0.600 | 0/100 | 0/100 |
| 250 | 155.0 | 0.620 | 0/100 | 1/100 |
| 250 | 160.0 | 0.640 | 0/100 | 1/100 |

MULTILAYER CERAMIC CAPACITOR

BACKGROUND

Field of the Invention

The present invention relates to a multilayer ceramic capacitor whose external electrodes each have wraparound parts that wrap around onto at least one height-direction face of the capacitor body.

Description of the Related Art

The size of a multilayer ceramic capacitor is specified by its length, width, and height, of which "height" refers to the dimension along the stacking direction of internal electrode layers. Also, a multilayer ceramic capacitor generally comprises a capacitor body of roughly rectangular solid shape having a capacitive part constituted by multiple internal electrode layers that are stacked together with dielectric layers in between, as well as a pair of external electrodes which are provided on both ends of the capacitor body in the length direction and to which the multiple internal electrode layers are connected alternately.

Incidentally, it is known that, when the external electrodes each have wraparound parts that wrap around onto at least one height-direction face of the capacitor body, one method to increase the capacitance of the multilayer ceramic capacitor without changing its size is to reduce the thickness of the wraparound parts (refer to Patent Literature 1, for example). To be specific, this method works in such a way that the number of internal electrode layers is increased by increasing the height of the capacitor body by an amount equivalent to the reduction in the thickness of the wraparound parts of the external electrodes.

However, reducing the thickness of the wraparound parts of the external electrodes presents a concern that the adhesion of the wraparound parts to the capacitor body may decrease, thereby causing the wraparound parts to separate from the capacitor body. For example, if the base conductor films at the wraparound parts are to be formed by applying, drying, and then baking an electrode paste, a glass material or co-material (dielectric material identical to the one constituting the capacitor body, etc.) is generally added to the electrode paste for the base conductor films in order to increase adhesion. If the thickness of the base conductor films is reduced, however, the absolute amount of glass material or co-material contained in these base conductor films decreases, and consequently their adhesion tends to drop compared to when the films are thicker. Also, the applied electrode paste may become substantially thinner at the peripheral edges compared to other parts, in which case the peripheral edges of the base conductor films do not adhere well.

BACKGROUND ART LITERATURES

[Patent Literature 1] Japanese Patent Laid-open No. 2012-256947

SUMMARY

The problem to be solved by the present invention is to provide a multilayer ceramic capacitor that mitigates the concern that the wraparound parts of the external electrodes may separate from the capacitor body, even when the thickness of the wraparound part is reduced.

Any discussion of problems and solutions involved in the related art has been included in this disclosure solely for the purposes of providing a context for the present invention, and should not be taken as an admission that any or all of the discussion were known at the time the invention was made.

To solve the aforementioned problem, a multilayer ceramic capacitor pertaining to the present invention is a multilayer ceramic capacitor comprising a capacitor body of roughly rectangular solid shape, as well as a pair of external electrodes provided on both ends of the capacitor body in the length direction, where the external electrodes each have wraparound parts that wrap around onto at least one height-direction face of the capacitor body, wherein: the capacitor body has: (a1) a capacitive element of roughly rectangular solid shape; (a2) first base conductor films provided on both length-direction ends of at least one height-direction face of the capacitive element; and (a3) a supplementary dielectric layer having a first cover part that covers the space between the first base conductor films on the at least one height-direction face of the capacitive element, and second cover parts that connect to the first cover part and also covers parts of the first base conductor films, respectively, in the length direction; one of the external electrodes has: (b1) a second base conductor film attached to one length-direction face of the capacitive element and also to one length-direction edges of the first base conductor films present on the one length-direction side of the capacitor body; and (b2) a surface conductor film attached continuously to the surface of the second base conductor film and also to a part of the surface of the first base conductor film not covered by the second cover part, wherein the wraparound part is constituted by the first base conductor films and the surface conductor film attached to the first base conductor film at the wraparound location; and the other of the external electrodes has: (c1) a second base conductor film attached to the other length-direction face of the capacitive element and also to the other length-direction edges of the first base conductor films present on the other length-direction side of the capacitor body; and (c2) a surface conductor film attached continuously to the surface of the second base conductor film and also to a part of the surface of the first base conductor film not covered by the second cover part, wherein the wraparound part is constituted by the first base conductor film and the surface conductor film attached to the first base conductor film at the wraparound locations.

According to a multilayer ceramic capacitor pertaining to the present invention, the concern that the wraparound parts of the external electrodes may separate from the capacitor body can be mitigated, even when the thickness of the wraparound part is reduced.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 5A and FIG. 5B are each a drawing explaining an example of how the multilayer ceramic capacitor shown in FIG. 1 is manufactured, where FIG. 5A is a drawing corresponding to FIG. 3, while

DESCRIPTION OF THE SYMBOLS

10—Multilayer ceramic capacitor, 11—Capacitor body, 11'—Capacitive element, 11a—Capacitive part, 11a1—Internal electrode layer, 11a2—Dielectric layer, 11b—Dielectric margin part, 11c—First base conductor film, 11d—Supplementary dielectric layer, 11d1—First cover part of the supplementary dielectric layer, 11d2—Second cover part of the supplementary dielectric layer, 12—First external electrode, 12a—Second base conductor film, 12b—Surface conductor film, 12b1—Wraparound location of the surface conductor film, 12c—Wraparound part, 13—Second external electrode, 13a—Second base conductor film, 13b—Surface conductor film, 13b1—Wraparound location of the surface conductor film, 13c—Wraparound part.

DETAILED DESCRIPTION OF EMBODIMENTS

Figure 1:
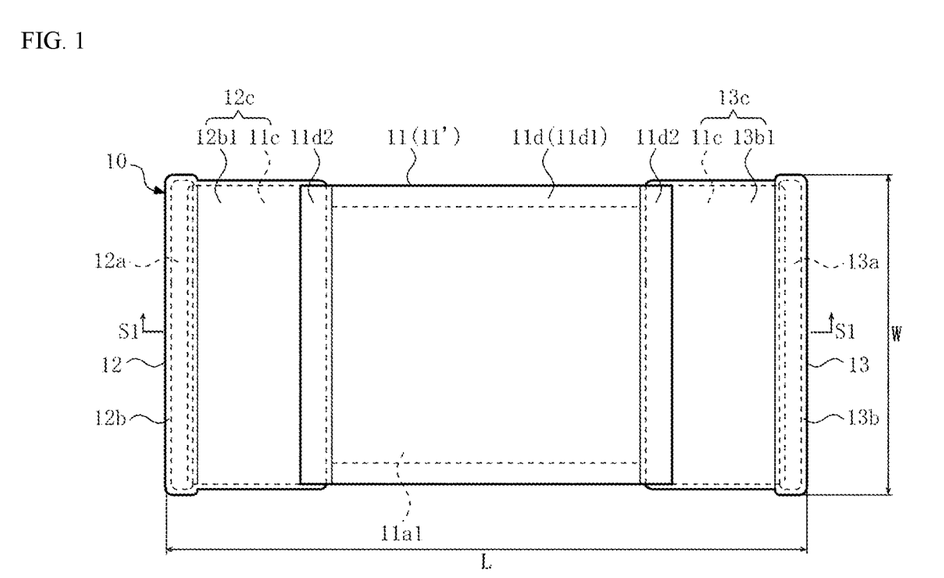
FIG. 1 is a view of a multilayer ceramic capacitor to which the present invention is applied, from one height-direction face side thereof.
Figure 2:
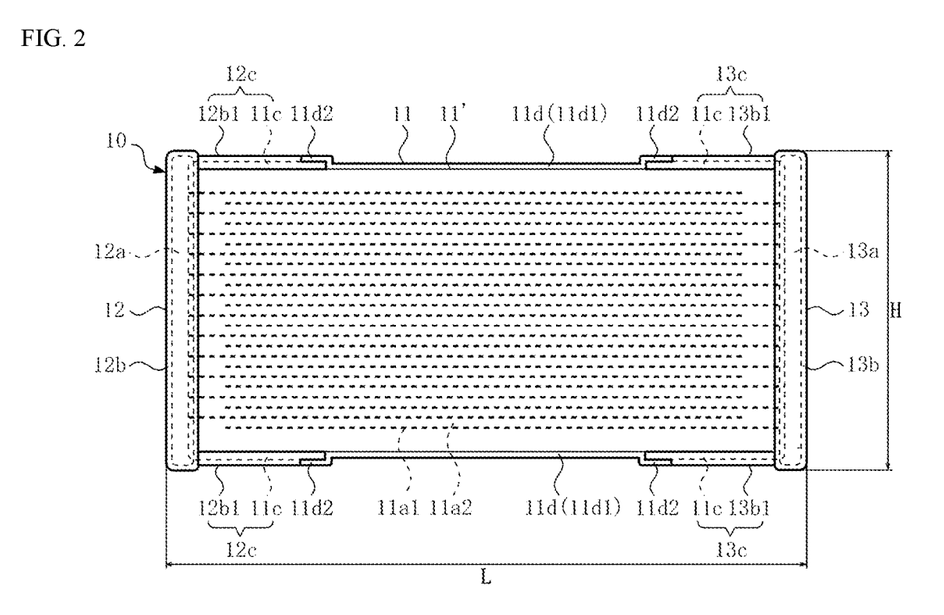
FIG. 2 is a view of the multilayer ceramic capacitor shown in FIG. 1, from one width-direction face side thereof.
Figure 3:
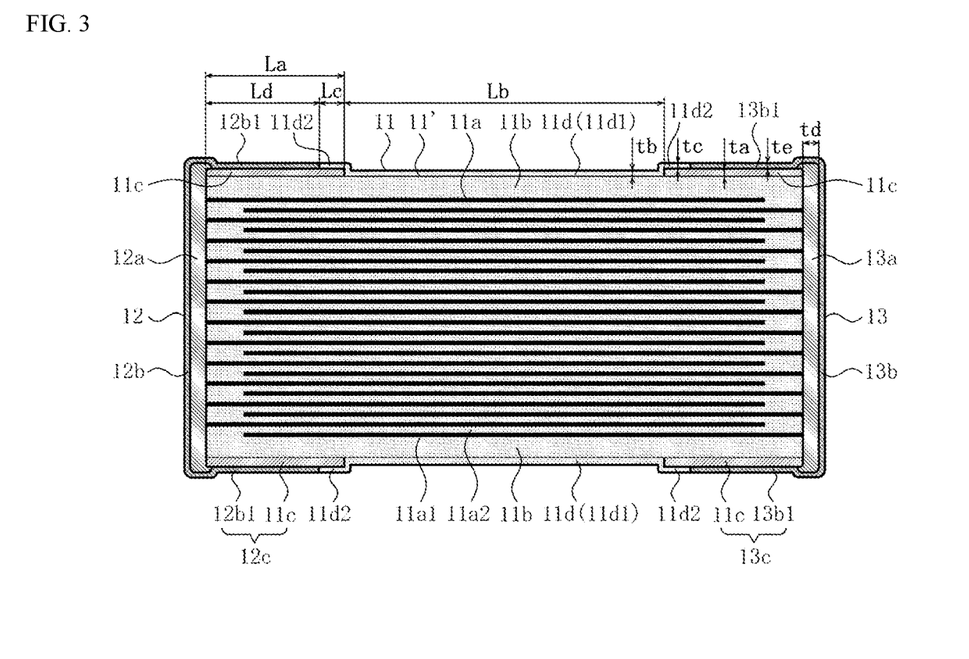
FIG. 3 is a cross-sectional view of the multilayer ceramic capacitor shown in FIG. 1, along line S1-S1.
Figure 4:
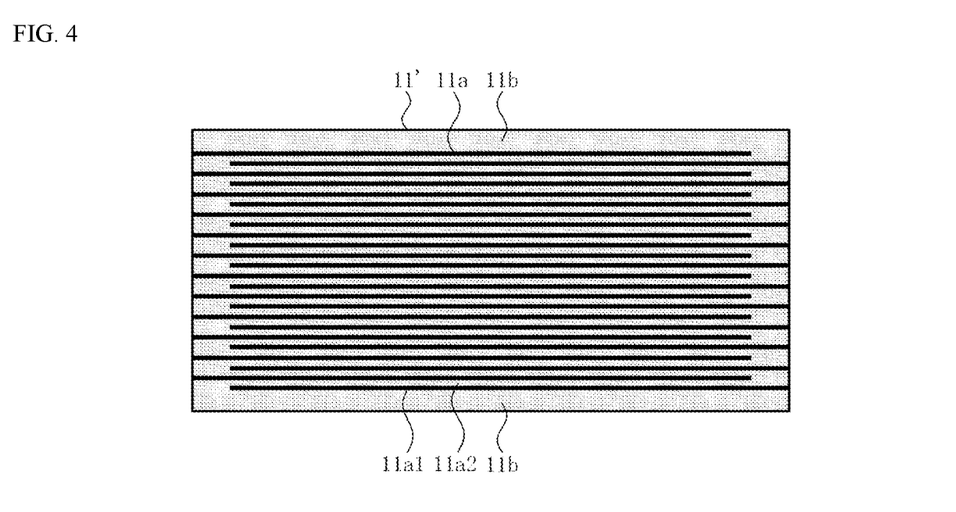
FIG. 4 is a drawing corresponding to FIG. 3, provided to explain an example of how the multilayer ceramic capacitor shown in FIG. 1 is manufactured.

First, the structure of a multilayer ceramic capacitor 10 to which the present invention is applied, is explained using FIGS. 1 to 3. In the following explanation, the lateral direction of FIG. 1 is referred to as the length direction, the vertical direction of FIG. 1 is referred to as the width direction, and the vertical direction of FIG. 2 is referred to as the height direction, while the dimensions along these length, width, and height directions are referred to as the length, width, and height, respectively.

The size of the multilayer ceramic capacitor 10 shown in FIGS. 1 to 3 is specified by its length L, width W, and height H. For reference, the actual dimensions of the length L, width W, and height H of the first prototype on which FIGS. 1 to 3 are based are 600 µm, 300 µm, and 300 µm, respectively, while the actual dimensions of the length L, width W, and height H of the second prototype are 1000 µm, 500 µm, and 500 µm, respectively, and in both cases the dimensions have the relationship of "Length L>Width W=Height H." This multilayer ceramic capacitor 10 has a capacitor body 11 of roughly rectangular solid shape, a first external electrode 12 provided on one length-direction end of the capacitor body 11, and a second external electrode 13 provided on the other length-direction end of the capacitor body 11.

The capacitor body 11 has: (a1) a capacitive element 11' of roughly rectangular solid shape, having a capacitive part 11a constituted by multiple internal electrode layers 11a1 that are stacked together with dielectric layers 11a2 in between, as well as dielectric margin parts 11b provided on both height-direction sides of the capacitive part 11a; (a2) first base conductor films 11c (total four films) provided on both length-direction ends of both height-direction faces of the capacitive element 11', respectively; and (a3) supplementary dielectric layers 11d, each having a first cover part 11d1 that covers the space between the two first base conductor films 11c on each of both height-direction faces of the capacitive element 11', and a second cover part 11d2 that connects to the first cover part 11d1 and also covers parts of the first base conductor films 11c, respectively, in the length direction. It should be noted that, while FIGS. 2 and 3 show a total of 24 internal electrode layers 11a1 for the convenience of illustration, the number of internal electrode layers 11a1 is not limited in any way.

Each internal electrode layer 11a1 has roughly the same external shape (roughly rectangular) and roughly the same thickness. The length (not accompanied by symbol) of each internal electrode layer 11a1 is smaller than the length (not accompanied by symbol) of the capacitive element 11', and the width (not accompanied by symbol) of each internal electrode layer 11a1 is smaller than the width (not accompanied by symbol) of the capacitive element 11'. The thickness of each internal electrode layer 11a1 is set in a range of 0.5 to 3 µm, for example.

Each dielectric layer 11a2 has roughly the same external shape (roughly rectangular) and roughly the same thickness. The length (not accompanied by symbol) of each dielectric layer 11a2 is roughly the same as the length of the capacitive element 11', and the width (not accompanied by symbol) of each dielectric layer 11a2 is roughly the same as the width of the capacitive element 11'. The thickness of each dielectric layer 11a2 is set in a range of 0.5 to 3 µm, for example.

Each dielectric margin part 11b has roughly the same external shape (roughly rectangular) and roughly the same thickness. The length (not accompanied by symbol) of each dielectric margin part 11b is roughly the same as the length of the capacitive element 11', and the width (not accompanied by symbol) of each dielectric margin part 11b is roughly the same as the width of the capacitive element 11'. The thickness of each dielectric margin part 11b is set in a range of 5 to 30 µm, for example.

The primary component of each internal electrode layer 11a1 is nickel, copper, palladium, platinum, silver, gold, alloy thereof, or other metal material, for example. The primary component of each dielectric layer 11a2 and primary component of each dielectric margin part 11b are both, or specifically the primary component of the capacitive element 11' excluding the internal electrode layers 11a1 is, barium titanate, strontium titanate, calcium titanate, magnesium titanate, calcium zirconate, calcium zirconate titanate, barium zirconate, titanium oxide, or other dielectric material (dielectric ceramic material), for example.

Each first base conductor film 11c has roughly the same external shape (roughly rectangular) and roughly the same thickness. The length La of each first base conductor film 11c is set in a range of one-sixth to three-sevenths the length L of the multilayer ceramic capacitor 10, for example, and the width (not accompanied by symbol) of each first base conductor film 11c is roughly the same as the width of the capacitive element 11'. The thickness ta of each first base conductor film 11c is set in a range of 2 to 6 μm, for example.

The primary component of each first base conductor film 11c is nickel, copper, palladium, platinum, silver, gold, alloy thereof, or other metal material, for example, and is preferably the same as the primary component of the internal electrode layers 11a1.

Each supplementary dielectric layer 11d has roughly the same external shape (roughly rectangular) and roughly the same thickness. The length (corresponding to Lb+2Lc) of each supplementary dielectric layer 11d is greater than the length-direction spacing (corresponding to Lb) between the two first base conductor films 11c on each of both height-direction faces of the capacitive element 11', and the width (not accompanied by symbol) of each supplementary dielectric layer 11d is roughly the same as the width of the capacitive element 11'.

The length Lb of the first cover part 11d1 of each supplementary dielectric layer 11d equals {Length of the capacitive element 11'−(2×Length La of the first base conductor film 11c)}. The thickness tb of the first cover part 11d1 of each supplementary dielectric layer 11d is set in a range of 2 to 6 for example, and is preferably the same as the thickness ta of the first base conductor film 11c. It should be noted that "thickness tb of the first cover part 11d1" indicates the thickness of each first cover part 11d1 excluding "parts extending in the height direction toward each second cover part 11d2" present on both length-direction ends thereof. In other words, the "thickness tb of the first cover part 11d1" does not include the thickness of the "parts extending in the height direction toward each second cover part 11d2." Also, the length Lc of the second cover part 11d2 of each supplementary dielectric layer 11d is five-hundredths the length La of the first base conductor film 11c or more, for example, and is preferably set in a range of five-hundredths to six-tenths the length La of the first base conductor film 11c. The thickness tc of the second cover part 11d2 of each supplementary dielectric layer 11d is set in a range of 1 to 5 μm, for example, and is preferably the same as the thickness te of the wraparound locations 12b1, 13b1 of the surface conductor films 12b, 13b as described later. In other words, the thickness tb of the first cover part 11d1 of each supplementary dielectric layer 11d is equal to or less than the sum of the thickness ta of the first base conductor film 11c and the thickness te of each wraparound location 12b1, 13b1 of the surface conductor film 12b, 13b as described later, or specifically the thickness of the wraparound part 12c, 13c as described later.

The primary component of each supplementary dielectric layer 11d is barium titanate, strontium titanate, calcium titanate, magnesium titanate, calcium zirconate, calcium zirconate titanate, barium zirconate, titanium oxide, or other dielectric material (dielectric ceramic material), for example, and is preferably the same as the primary component of the capacitive element 11' excluding the internal electrode layers 11a1.

The first external electrode 12 has: (b1) a second base conductor film 12a attached to one length-direction face (left face in FIG. 3) of the capacitive element 11' and also to one length-direction edges (left edges in FIG. 3) of the two first base conductor films 11c present on one length-direction side (left side in FIG. 3) of the capacitor body 11; and (b2) a surface conductor film 12b attached continuously to the surface of the second base conductor film 12a and also to the parts of the surfaces of the two first base conductor films 11c not covered by the second cover parts 11d2 of the supplementary dielectric layers 11d. In other words, the first external electrode 12 has two wraparound parts 12c that wrap around onto both height-direction faces of the capacitor body 11, each constituted by each first base conductor film 11c and the wraparound location 12b1 of the surface conductor film 12b attached to each first base conductor film 11c.

The second external electrode 13 has: (c1) a second base conductor film 13a attached to the other length-direction face (right face in FIG. 3) of the capacitive element 11' and also to the other length-direction edges (right edges in FIG. 3) of the two first base conductor films 11c present on the other length-direction side (right side in FIG. 3) of the capacitor body 11; and (c2) a surface conductor film 13b attached continuously to the surface of the second base conductor film 13a and also to the parts of the surfaces of the two first base conductor films 11c not covered by the second cover parts 11d2 of the supplementary dielectric layers 11d. In other words, the second external electrode 13 has two wraparound parts 13c that wrap around onto both height-direction faces of the capacitor body 11, each constituted by each first base conductor film 11c and the wraparound location 13b1 of the surface conductor film 13b attached to each first base conductor film 11c.

In other words, the external electrodes 12, 13 each have two wraparound parts 12c, 13c that wrap around onto both height-direction faces of the capacitor body 11. As is evident from FIG. 3, the edges of the multiple internal electrode layers 11a1 described earlier are connected alternately to the second base conductor film 12a of the first external electrode 12 and the second base conductor film 13a of the second external electrode 13. It should be noted that, while the second base conductor films 12a, 13a of the external electrodes 12, 13 depicted in FIGS. 1 to 3 have both of their height-direction edges slightly overlapping the first base conductor films 11c, these overlapping parts may not be necessary or the overlapping parts may be slightly longer than as illustrated.

The thickness td of the second base conductor film 12a, 13a of each external electrode 12, 13 is set in a range of 5 to 15 μm, for example. The thickness to of the surface conductor film 12b, 13b of each external electrode 12, 13 is set in a range of 1 to 5 μm, for example. Also, the length Ld of the wraparound location 12b1, 13b1 of the surface conductor film 12b, 13b of each external electrode 12, 13 equals {Length La of the first base conductor film 11c− Length Lc of the second cover part 11d2 of the supplementary dielectric layer 11d}.

The primary component of the second base conductor film 12a, 13a of each external electrode 12, 13 is nickel, copper, palladium, platinum, silver, gold, alloy thereof, or other metal material, for example. Also, the primary component of the surface conductor film 12b, 13b of each external electrode 12, 13 is copper, nickel, tin, palladium, gold, zinc, alloy thereof, or other metal material, for example. It should be noted that, while the surface conductor films 12b, 13b shown in FIG. 3 each have a single-layer structure, the surface conductor films 12b, 13b may each have a multi-layer structure comprising two or more film layers of different primary components. For instance, if the primary component of each internal electrode layer 11a1, primary component of each first base conductor film 11c, and primary component of each second base conductor film 12a, 13a are all nickel, then a film whose primary component is tin may be used favorably for single-layer surface conductor films 12b, 13b, or a combination of a film whose primary component is nickel and a film whose primary component is tin may be used favorably for two-layer surface conductor films 12b, 13b, or a combination of a film whose primary component is copper, a film whose primary component is nickel, and a film whose primary component is tin may be used favorably for three-layer surface conductor films 12b, 13b.

Next, an example of how the multilayer ceramic capacitor 10 shown in FIGS. 1 to 3 is manufactured, or specifically an example of manufacturing method where the primary component of the capacitive element 11' excluding the internal electrode layers 11a1 and primary component of each supplementary dielectric layer 11d, are both barium titanate, the primary component of each internal electrode layer 11a1, primary component of each first base conductor film 11c, and primary component of each second base conductor film 12a, 13a are all nickel, and the primary component of each surface conductor film 12b, 13b is tin, is explained using FIGS. 4 to 7 and also by quoting the symbols shown in FIGS. 1 to 3. It should be noted that the example of manufacturing method explained here is only one example and does not limit in any way how the multilayer ceramic capacitor 10 is manufactured.

For the manufacture, first a ceramic slurry containing barium titanate powder, organic solvent, organic binder, dispersant, etc., a first electrode paste containing nickel powder, organic solvent, organic binder, dispersant, etc., and a second electrode paste containing nickel powder, barium titanate powder (co-material), organic solvent, organic binder, dispersant, etc., are prepared.

Next, the ceramic slurry is coated on the surfaces of carrier films and then dried, to produce first sheets. Also, the first electrode paste is printed on the surfaces of these first sheets and then dried, to produce second sheets on which matrix or zigzag-shaped, unsintered internal electrode layer patterns have been formed. Furthermore, the second electrode paste is printed on the surfaces of first sheets and then dried to form striped, unsintered first base conductor film patterns corresponding to the first base conductor films 11c, after which the ceramic slurry is printed in a manner covering the spaces between the adjacent unsintered first base conductor film patterns while also covering parts of the adjacent unsintered first base conductor film patterns, and then dried, to form striped, unsintered supplementary dielectric layer patterns corresponding to the supplementary dielectric layers 11d, to produce third sheets on which the unsintered first base conductor film patterns and unsintered supplementary dielectric layer patterns have been formed.

Next, a specified number of unit sheets taken from the first sheets are stacked and thermally compressed one by one, to form an area corresponding to the dielectric margin part 11b in one height direction. Next, a specified number of unit sheets taken from the second sheets (including the unsintered internal electrode layer patterns) are stacked and thermally compressed one by one, to form an area corresponding to the capacitive part 11a. Next, a specified number of unit sheets taken from the first sheets are stacked and thermally compressed one by one, to form an area corresponding to the dielectric margin part 11b in the other height direction. Lastly, the entire sheets are thermally compressed together to produce an unsintered first multilayer sheet (refer to FIG. 4). It should be noted that, while the unsintered first multilayer sheet depicted in FIG. 4 corresponds to one multilayer ceramic capacitor 10 above for the convenience of illustration, the actual unsintered first multilayer sheet has a size that allows multiple multilayer ceramic capacitors to be taken from it.

Figure 5A:
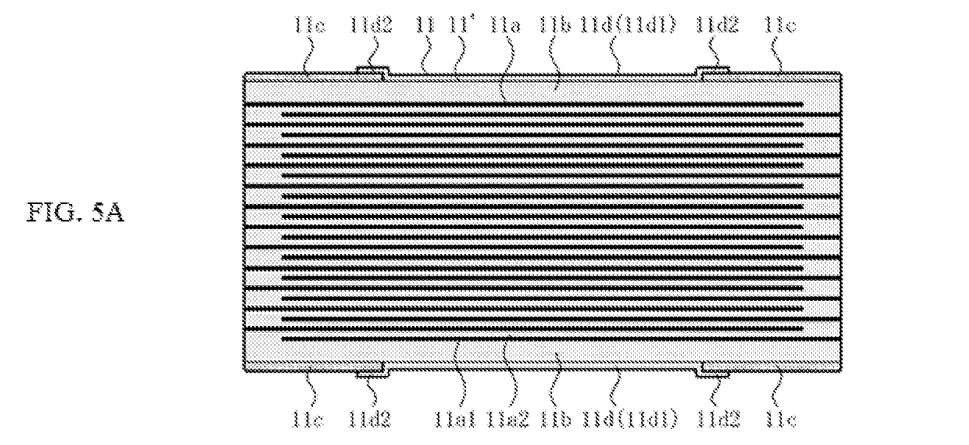
Figure 5B:
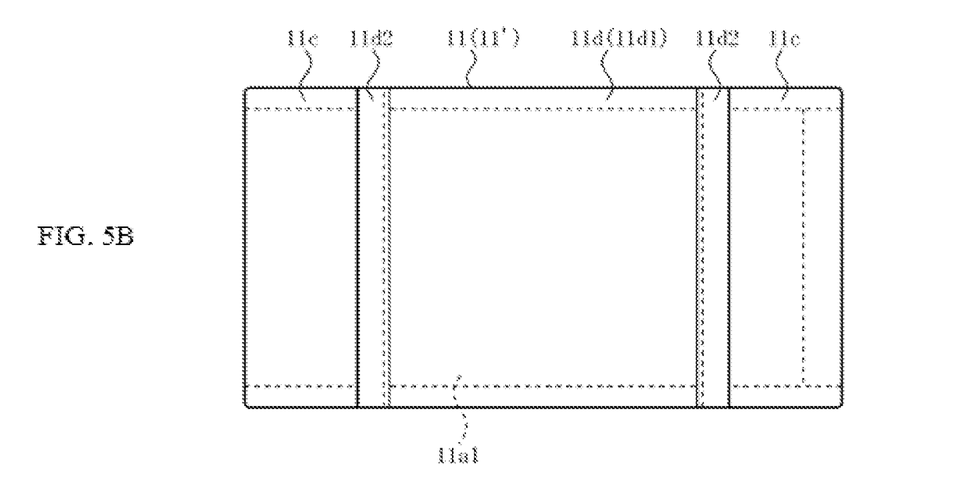
FIG. 5B is a drawing corresponding to FIG. 1.

Next, third sheets are stacked on both height-direction faces of the unsintered first multilayer sheet and then thermally compressed, after which the entire sheets are thermally compressed together as necessary, to produce an unsintered second multilayer sheet (refer to FIGS. 5A and 5B). It should be noted that, while the unsintered second multilayer sheet depicted in FIGS. 5A and 5B corresponds to one multilayer ceramic capacitor 10 above, the actual unsintered second multilayer sheet has a size that allows multiple multilayer ceramic capacitors to be taken from it.

Next, the unsintered second multilayer sheet having a size that allows multiple multilayer ceramic capacitors to be taken from it, is cut into a grid, to produce unsintered capacitor bodies each corresponding to the capacitor body 11 (refer to FIGS. 5A and 5B). Next, the second electrode paste is applied on both length-direction faces of each unsintered capacitor body by dip-coating, roller-coating or other method, and then dried, to produce second base conductor films corresponding to the second base conductor films 12a, 13a (refer to FIG. 6).

Figure 6:
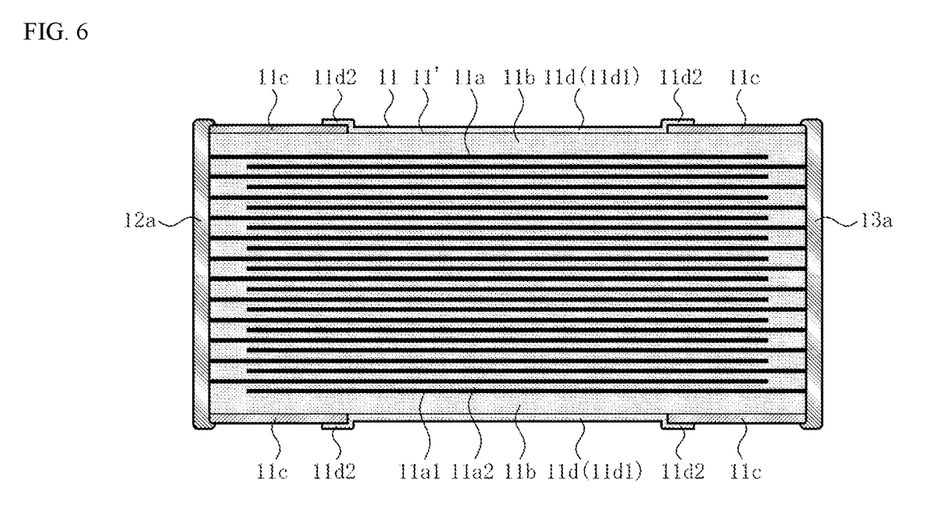
FIG. 6 is a drawing corresponding to FIG. 3, provided to explain an example of how the multilayer ceramic capacitor shown in FIG. 1 is manufactured.
Figure 7:
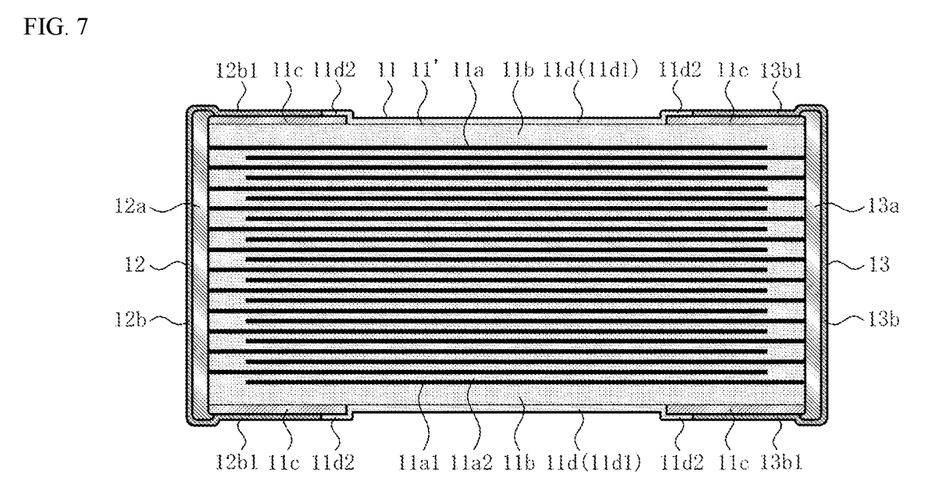
FIG. 7 is a drawing corresponding to FIG. 3, provided to explain an example of how the multilayer ceramic capacitor shown in FIG. 1 is manufactured.

Next, multiple unsintered capacitor bodies having unsintered second base conductor films are introduced to a sintering furnace and sintered (including binder removal and sintering) simultaneously in a reducing ambience based on a temperature profile appropriate for barium titanate and nickel, to produce capacitor bodies 11 having second base conductor films 12a, 13a (refer to FIG. 6). Next, electroplating or other wet plating method is used to produce surface conductor films 12b, 13b (whose primary component is tin) that are continuously attached to the surfaces of the second base conductor films 12a, 13a and the surfaces of the first base conductor films 11c (refer to FIG. 7).

It should be noted that the second base conductor films 12a, 13a may be produced in the steps of producing a capacitor body 11 by sintering the aforementioned unsintered capacitor body (refer to FIGS. 5A and 5B) in the same manner as mentioned above, and then applying on both length-direction faces of the capacitor body 11, and drying and baking, the second electrode paste.

Also, the primary component of the capacitive element 11' excluding the internal electrode layers 11a1 may be any dielectric material other than barium titanate, the primary component of each supplementary dielectric layer 11d may be any dielectric material other than barium titanate, the primary component of each internal electrode layer 11a1 may be any metal material other than nickel, the primary component of each first base conductor films 11c may be any metal material other than nickel, the primary component of each second base conductor film 12a, 13a may be any metal material other than nickel, and the primary component of each surface conductor film 12b, 13b may be any metal material other than tin, as mentioned earlier. In addition, each surface conductor film 12b, 13b may have a multi-layer structure comprising two or more film layers of different primary components, as mentioned earlier.

Figure 8:
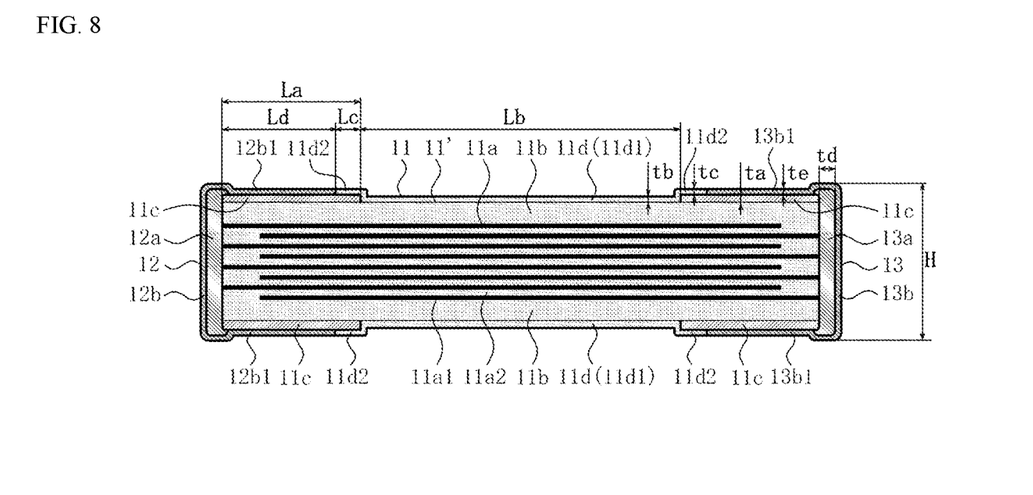
FIG. 8 is a drawing corresponding to FIG. 3, illustrating another multilayer ceramic capacitor to which the present invention is applied.
Figure 9:
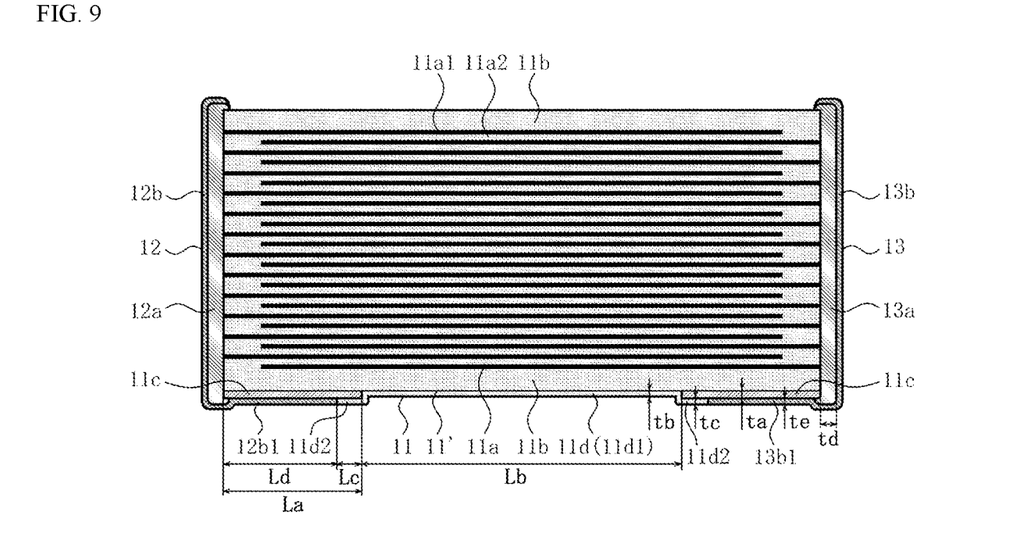
FIG. 9 is a drawing corresponding to FIG. 3, illustrating another multilayer ceramic capacitor to which the present invention is applied.

Next, the structure of another multilayer ceramic capacitor to which the present invention is applied, is explained using FIGS. 8 and 9.

The multilayer ceramic capacitor shown in FIG. 8 has a height H equal to one-half the height H of the multilayer ceramic capacitor 10 shown in FIGS. 1 to 3. For reference, the actual dimensions of the length L, width W, and height H of the third prototype on which FIG. 8 is based are 600 μm, 300 μm, and 150 μm, respectively, while the actual dimensions of the length L, width W, and height H of the fourth prototype are 1000 μm, 500 μm, and 250 μm, respectively, and in both cases the dimensions have the relationship of "Length L>Width W>Height H." The values of height H indicated above (150 μm and 250 μm) are only examples, and so long as it is smaller than the width W of the multilayer ceramic capacitor 10, the value of height H is not limited in any way. It should be noted that, while the second base conductor films 12a, 13a of the external electrodes 12, 13 depicted in FIG. 8 have both of their height-direction edges slightly overlapping the first base conductor films 11c, as is the case with FIGS. 1 to 3, these overlapping parts may not be necessary or the overlapping parts may be slightly longer than as illustrated.

The multilayer ceramic capacitor shown in FIG. 9 is the same as the multilayer ceramic capacitor 10 shown in FIGS. 1 to 3, except that the two first base conductor films 11c and supplementary dielectric layers 11d present on the other height-direction face (top face in FIG. 3) of the capacitor body 11 have been eliminated, and that, because of this elimination, the wraparound locations 12b1, 13b1 on the other height-direction face have also been eliminated from the surface conductor films 12b, 13b of the external electrodes 12, 13. In other words, the external electrodes 12, 13 of the multilayer ceramic capacitor shown in FIG. 9 each have one wraparound part that only wraps around onto one height-direction face (bottom face in FIG. 9) of the capacitor body 11 (corresponding to 12c and 13c; refer to FIGS. 1 to 3). The mode of the external electrodes 12, 13 shown here may also be applied to the multilayer ceramic capacitor whose height H is smaller as explained using FIG. 8. It should be noted that, while the second base conductor films 12a, 13a of the external electrodes 12, 13 depicted in FIG. 9 have both of their height-direction edges slightly overlapping the first base conductor films 11c and the other height-direction face (top face in FIG. 9) of the capacitor body 11, as is the case with FIGS. 1 to 3, these overlapping parts may not be necessary or the overlapping parts may be slightly longer than as illustrated.

Also, while not illustrated, third base conductor films may be provided on both width-direction sides of the capacitor body 11 of the multilayer ceramic capacitor 10 shown in FIGS. 1 to 3 in a manner continuing to the first base conductor films 11c, and the surface conductor films 12b, 13b may be provided in a manner also attaching to the surfaces of these third base conductor films; this way, the external electrodes 12, 13 can be constituted so that each has a total of four wraparound parts including those that wrap around onto both width-direction faces, in addition to those that wrap around onto both height-direction faces, of the capacitor body 11.

Next, the effects achieved by the multilayer ceramic capacitor 10 shown in FIGS. 1 to 3 are explained. The effects explained here can also be achieved with the multilayer ceramic capacitors respectively shown in FIGS. 8 and 9, in the same manner.

[Effect 1] Because the first base conductor films 11c constituting the wraparound parts 12c, 13c of the external electrodes 12, 13 are partially covered with the second cover parts 11d2 of the supplementary dielectric layers 11d in the length direction, adhesion of the first base conductor films 11c can be supplemented effectively by the second cover parts 11d2, even when the thickness of the first base conductor films 11c is reduced, and consequently the concern that the first conductor base films 11c may separate from the capacitor body 11, or specifically the concern that the wraparound parts 12c, 13c of the external electrodes 12, 13 may separate from the capacitor body 11, can be mitigated.

[Effect 2] Because the supplementary dielectric layers 11d have first cover parts 11d1 that continue to the second cover parts 11d2, the strength of the capacitor body 11 can also be supplemented by the first cover parts 11d1, even when the height H of the multilayer ceramic capacitor 10 is reduced.

[Effect 3] Because the thickness tb of the first cover part 11d1 of the supplementary dielectric layer 11d is equal to or less than the thickness (corresponding to ta+te) of the wraparound part 12c, 13c of each external electrode 12, 13, the first cover parts 11d1 do not become obstacles in the way of mounting the multilayer ceramic capacitor 10 on a circuit board or storing it in a component-embedded board.

[Effect 4] By setting the length La of the first base conductor film 11c constituting the wraparound part 12c, 13c of each external electrode 12, 13 in a range of one-sixth to three-sevenths the length L of the multilayer ceramic capacitor 10 according to the length Lc of the second cover part 11d2 of the supplementary dielectric layer 11d, the size of the multilayer ceramic capacitor 10, or the like, sufficient connection areas with the wraparound parts 12c, 13c of the external electrodes 12, 13 can be ensured when mounting the multilayer ceramic capacitor 10 on a circuit board or storing it in a component-embedded board.

Figure 10:
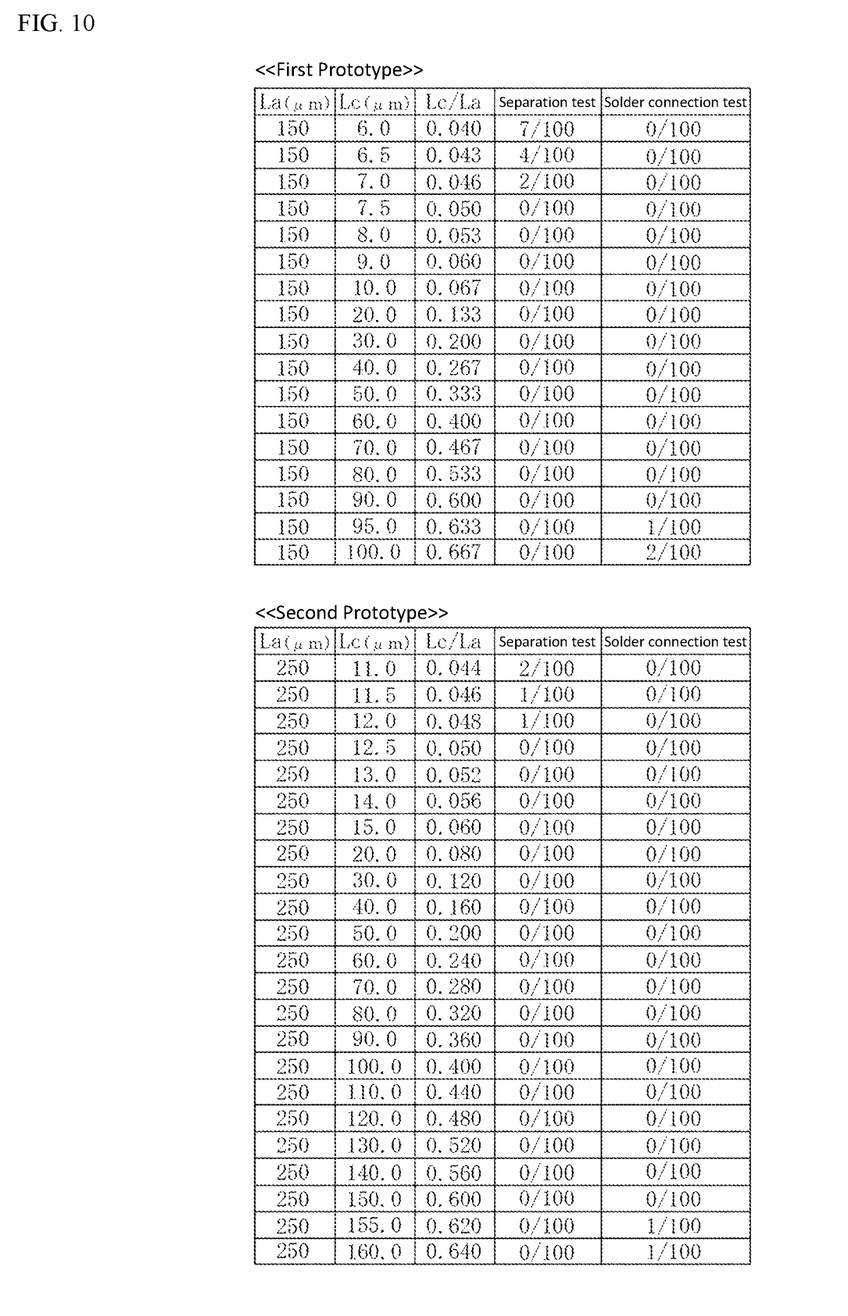
FIG. 10 is a set of tables showing the verification results of the effects obtained by embodiments of the present invention.

Next, the verification result of Effect 1 (effect relating to separation) above is explained using FIG. 10 and also by quoting the symbols shown in FIGS. 1 to 3.

The first prototype shown in FIG. 10 is a multilayer ceramic capacitor whose length L is 600 μm, width W is 300 μm, and height H is 300 μm, while the second prototype is a multilayer ceramic capacitor whose length L is 1000 μm, width W is 500 μm, and height H is 500 μm. The structure of the first prototype and that of the second prototype were explained earlier using FIGS. 1 to 3.

Additionally, with the first prototype and also with the second prototype, the primary component of the capacitive element 11' excluding the internal electrode layers 11a1 and primary component of each supplementary dielectric layer 11d, are both barium titanate, the primary component of each internal electrode layer 11a1, primary component of each first base conductor film 11c, and primary component of each second base conductor film 12a, 13a are all nickel, and the primary component of each surface conductor film 12b, 13b is tin, and both prototypes were manufactured according to the example of manufacturing method that was explained using FIGS. 4 to 7.

The specifications of the key parts of the first prototype are as follows: the length La of each first base conductor film 11c is 150 μm; the thickness ta of each first base conductor film 11c is 4 μm; the thickness tb of the first cover part 11d1 of each supplementary dielectric layer 11d is 4 μm; the thickness tc of the second cover part 11d2 of each supplementary dielectric layer 11d is 3 μm; the thickness td of the second base conductor film 12a, 13a of each external electrode 12, 13 is 10 μm; and the thickness te of the surface conductor film 12b, 13b of each external electrode 12, 13 is 3 μm. For the verification, 100 samples were prepared for the first prototype with each different length Lc of the second cover part 11d2 of each supplementary dielectric layer 11d (refer to FIG. 10).

Specifications of the key parts of the second prototype are as follows: the length La of each first base conductor film 11c is 250 μm; the thickness ta of each first base conductor film 11c is 4 μm; the thickness tb of the first cover part 11d1 of each supplementary dielectric layer 11d is 4 μm; the thickness tc of the second cover part 11d2 of each supplementary dielectric layer 11d is 3 µm; the thickness td of the second base conductor film 12a, 13a of each external electrode 12, 13 is 10 µm; and the thickness te of the surface conductor film 12b, 13b of each external electrode 12, 13 is 3 µm. For the verification, 100 samples were prepared for the second prototype with each different length Lc of the second cover part 11d2 of each supplementary dielectric layer 11d (refer to FIG. 10).

The "Separation test" columns in FIG. 10 shows the separation resistance inspection results of the wraparound parts 12c, 13c of the external electrodes 12, 13. To be specific, the first prototype and second prototype samples having second cover parts 11d2 of different lengths Lc were subjected to a test that involved pressing and then removing pieces of an adhesive tape (CT-24 manufactured by Nichiban) having a sticking force of 10 N per 25 mm onto/from the wraparound parts 12c, 13c of the external electrodes 12, 13, and the number n of samples that experienced a separation of any one location was indicated, in the format of n/100, for each length Lc of the second cover part 11d2.

It is evident from the values in the "Separation test" columns in FIG. 10 that, with the first prototype samples, the wraparound parts 12c, 13c of the external electrodes 12, 13 no longer separated when {Length Lc of the second cover part 11d2 of each supplementary dielectric layer 11d/Length La of each first base conductor film 11c} was 0.050 or more. Also, with the second prototype samples, the wraparound parts 12c, 13c of the external electrodes 12, 13 no longer separated when {Length Lc of the second cover part 11d2 of each supplementary dielectric layer 11d/Length La of each first base conductor film 110 was 0.050 or more.

Based on the above, the concern that the wraparound parts 12c, 13c of the external electrodes 12, 13 may separate can be mitigated, not only with the first prototype and second prototype, but also with the other multilayer ceramic capacitor structures described earlier, so long as "Length Lc of the second cover part 11d2 of each supplementary dielectric layer 11d/Length La of each first base conductor film 11c} is set to 0.050 or more.

The "Solder connection test" columns in FIG. 10 shows the inspection results of conditions of the external electrodes 12, 13 when they are each connected to two conductor pads on a test board using solder. The conductor pads on the test board for the first prototype were roughly rectangular in shape and had a length of 250 µm and width of 400 µm, with the spacing between the conductor pads set to 300 µm. For the test, a solder paste with a melting point of 260° C. was printed to a thickness of 30 µm on the surfaces of two conductor pads on this test board for the first prototype, and after placing the external electrodes 12, 13 of the first prototype sample on them, the test board was introduced into a reflow furnace to be soldered. On the other hand, the conductor pads on the test board for the second prototype were roughly rectangular in shape and had a length of 350 µm and width of 600 µm, with the spacing between the conductor pads set to 600 µm. For the test, a solder paste was printed in the same manner as above on the surfaces of two conductor pads on this test board for the second prototype, and after placing the external electrodes 12, 13 of the second prototype sample on them, the test board was introduced into a reflow furnace to be soldered. Then, the connection conditions of 100 first prototype samples and connection conditions of 100 second prototype samples were checked with a stereomicroscope at ×5 magnifications, and the number m of samples whose external electrodes 12, 13 were connected in a manner protruding from the conductor pads was indicated in units of m/100 for each length Lc of the second cover part 11d2.

It is evident from the values in the "Solder connection test" columns in FIG. 10 that, with the first prototype samples, the external electrodes 12, 13 can be connected properly without protruding from the conductor pads when {Length Lc of the second cover part 11d2 of each supplementary dielectric layer 11d/Length La of each first base conductor film 11c} was 0.600 or less. Also, with the second prototype samples, the external electrodes 12, 13 can be connected properly without protruding from the conductor pads when {Length Lc of the second cover part 11d2 of each supplementary dielectric layer 11d/Length La of each first base conductor film 11c} was 0.600 or less.

Based on the above, the external electrodes 12, 13 can be connected onto conductor pads using solder and consequently the multilayer ceramic capacitor can be mounted on a circuit board in a favorable manner, not only with the first prototype and second prototype, but also with the other multilayer ceramic capacitor structures described earlier, so long as "Length Lc of the second cover part 11d2 of each supplementary dielectric layer 11d/Length La of each first base conductor film 11c} is set to 0.600 or less.

An overall evaluation of the results in the "Separation test" columns and "Solder connection test" columns in FIG. 10 finds that, by setting the length Lc of the second cover part 11d2 of each supplementary dielectric layer 11d in a range of five-hundredths to six-tenths the length La of the first base conductor film 11c, the concern that the wraparound parts 12c, 13c of the external electrodes 12, 13 may separate can be mitigated, while at the same time the external electrodes 12, 13 can be connected onto conductor pads using solder and consequently the multilayer ceramic capacitor can be mounted on a circuit board in a favorable manner.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-145122, filed Jul. 25, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor comprising a capacitor body of roughly rectangular solid shape, as well as a pair of external electrodes provided on both ends of the capacitor body in a length direction, where the external electrodes each have wraparound parts that wrap around onto at least one height-direction face of the capacitor body, wherein:

the capacitor body has: (a1) a capacitive element of roughly rectangular solid shape; (a2) first base conductor films provided on both length-direction ends of at least one height-direction face of the capacitive element without extending to both length-direction faces of the capacitive element; and (a3) a supplementary dielectric layer having a first cover part that covers the space between the first base conductor films on the at least one height-direction face of the capacitive element, and second cover parts that connect to the first cover part and also covers parts of the first base conductor films, respectively, in the length direction, wherein a primary component of the supplementary dielectric layer and a primary component of the capacitive element excluding internal electrode layers embedded therein are compositionally the same;

one of the external electrodes has: (b1) a second base conductor film attached to and in contact with one length-direction face of the capacitive element and also attached to and in contact with one length-direction edge of the first base conductor film present on the one length-direction side of the capacitor body where a thickness of the first base conductor film is smaller than a thickness of the second base conductor; and (b2) a surface conductor film attached to and in contact with an entire outer surface of the second base conductor film and also continuously attached to and in contact with a part of a surface of the first base conductor film not covered by the second cover part, wherein the wraparound part is constituted by the first base conductor film and the surface conductor film attached to the first base conductor film at the wraparound location, and the wraparound part of the surface conductor film is exposed on the height-direction face of the capacitor body along an entire width of the capacitor body for mounting the multilayer ceramic capacitor to a circuit board by soldering; and another of the external electrodes has: (c1) a second base conductor film attached to and in contact with another length-direction face of the capacitive element and also attached to and in contact with another length-direction edge of the first base conductor film present on the other length-direction side of the capacitor body where a thickness of the first base conductor film is smaller than a thickness of the second base conductor; and (c2) a surface conductor film attached to and in contact with an entire outer surface of the second base conductor film and also continuously attached to and in contact with a part of a surface of the first base conductor film not covered by the second cover part, wherein the wraparound part is constituted by the first base conductor film and the surface conductor film attached to the first base conductor film at the wraparound location, and the wraparound part of the surface conductor film is exposed on the height-direction face of the capacitor body along an entire width of the capacitor body for mounting the multilayer ceramic capacitor to a circuit board by soldering.

2. A multilayer ceramic capacitor according to claim 1, wherein a length of the first base conductor film is set in a range of one-sixth to three-sevenths a length of the multilayer ceramic capacitor.

3. A multilayer ceramic capacitor according to claim 1, wherein a length of the second cover part of the supplementary dielectric layer is five-hundredths a length of the first base conductor film or more.

4. A multilayer ceramic capacitor according to claim 2, wherein a length of the second cover part of the supplementary dielectric layer is five-hundredths a length of the first base conductor film or more.

5. A multilayer ceramic capacitor according to claim 2, wherein a length of the second cover part of the supplementary dielectric layer is set in a range of five-hundredths to six-tenths a length of the first base conductor film.

6. A multilayer ceramic capacitor according to claim 1, wherein the first base conductor films are provided on both height-direction faces of the capacitive element, and the external electrodes each have two wraparound parts that wrap around onto both height-direction faces of the capacitor body.

7. A multilayer ceramic capacitor according to claim 2, wherein the first base conductor films are provided on both height-direction faces of the capacitive element, and the external electrodes each have two wraparound parts that wrap around onto both height-direction faces of the capacitor body.

8. A multilayer ceramic capacitor according to claim 3, wherein the first base conductor films are provided on both height-direction faces of the capacitive element, and the external electrodes each have two wraparound parts that wrap around onto both height-direction faces of the capacitor body.

9. A multilayer ceramic capacitor comprising a capacitor body of roughly rectangular solid shape, as well as a pair of external electrodes provided on both ends of the capacitor body in a length direction, where the external electrodes each have wraparound parts that wrap around onto at least one height-direction face of the capacitor body, wherein:

the capacitor body has: (a1) a capacitive element of roughly rectangular solid shape; (a2) first base conductor films provided on both length-direction ends of at least one height-direction face of the capacitive element without extending to both length-direction faces of the capacitive element and (a3) a supplementary dielectric layer having a first cover part that covers the space between the first base conductor films on the at least one height-direction face of the capacitive element, and second cover parts that connect to the first cover part and also covers parts of the first base conductor films, respectively, in the length direction, wherein a primary component of the supplementary dielectric layer and a primary component of the capacitive element excluding internal electrode layers embedded therein are compositionally the same;

one of the external electrodes has: (b1) a second base conductor film attached to and in contact with one length-direction face of the capacitive element and also attached to and in contact with one length-direction edge of the first base conductor film present on the one length-direction side of the capacitor body where a thickness of the first base conductor film is smaller than a thickness of the second base conductor; and (b2) a surface conductor film attached to and in contact with an entire outer surface of the second base conductor film and also continuously attached to and in contact with a part of a surface of the first base conductor film not covered by the second cover part, wherein the wraparound part is constituted by the first base conductor film and the surface conductor film attached to the first base conductor film at the wraparound location; and another of the external electrodes has: (c1) a second base conductor film attached to and in contact with another length-direction face of the capacitive element and also attached to and in contact with another length-direction edge of the first base conductor film present on the other length-direction side of the capacitor body where a thickness of the first base conductor film is smaller than a thickness of the second base conductor; and (c2) a surface conductor film attached to and in contact with an entire outer surface of the second base conductor film and also continuously attached to and in contact with a part of a surface of the first base conductor film not covered by the second cover part, wherein the wraparound part is constituted by the first base conductor film and the surface conductor film attached to the first base conductor film at the wraparound location, wherein a length of the second cover part of the supplementary dielectric layer is set in a range of five-hundredths to six-tenths a length of the first base conductor film.

10. A multilayer ceramic capacitor according to claim 9, wherein a thickness of the first cover part of the supplementary dielectric layer is equal to or less than a thickness of the wraparound part of each of the external electrodes.

11. A multilayer ceramic capacitor according to claim 9, wherein a length of the first base conductor film is set in a range of one-sixth to three-sevenths a length of the multilayer ceramic capacitor.

12. A multilayer ceramic capacitor according to claim 10, wherein the first base conductor films are provided on both height-direction faces of the capacitive element, and the external electrodes each have two wraparound parts that wrap around onto both height-direction faces of the capacitor body.

13. A multilayer ceramic capacitor according to claim 9, wherein the first base conductor films are provided on both height-direction faces of the capacitive element, and the external electrodes each have two wraparound parts that wrap around onto both height-direction faces of the capacitor body.

* * * * *